No. 636,343. Patented Nov. 7, 1899.
H. LEINEWEBER.
PNEUMATIC VALVE.
(Application filed Feb. 27, 1899.)
(No Model.)
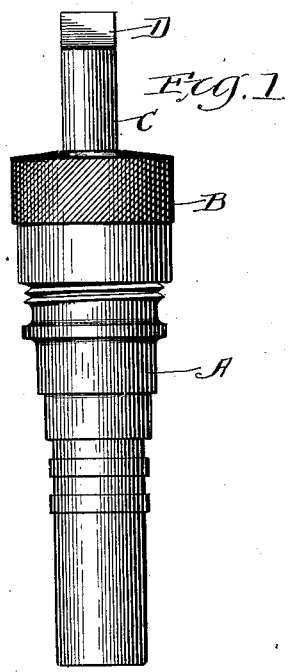
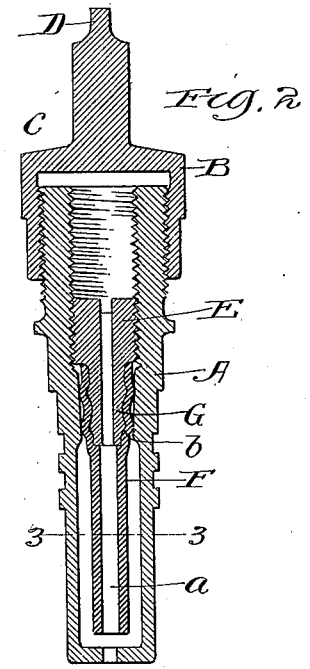
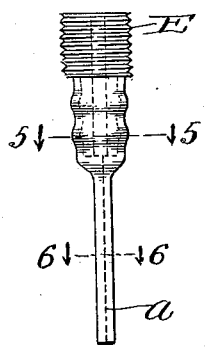
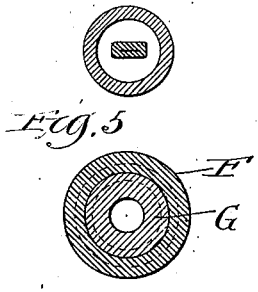
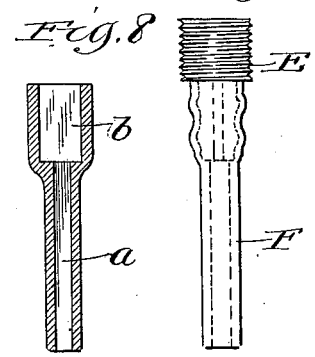
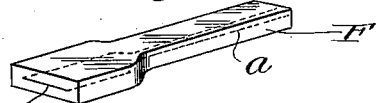
Witnesses:
Inventor:
Herman Leineweber
By Raymond & ... Attys.
THE NORRIS PETERS CO., PHOTO-LITHO., WASHINGTON, D. C.

UNITED STATES PATENT OFFICE.

HERMAN LEINEWEBER, OF CHICAGO, ILLINOIS, ASSIGNOR OF ONE-HALF TO CHARLES H. TREGO, OF SAME PLACE, AND JOHN E. ROBERTS, OF EVANSTON, ILLINOIS.

PNEUMATIC VALVE.

SPECIFICATION forming part of Letters Patent No. 636,343, dated November 7, 1899.

Application filed February 27, 1899. Serial No. 707,041. (No model.)

*To all whom it may concern:*

Be it known that I, HERMAN LEINEWEBER, a citizen of the United States, residing at South Chicago, in the county of Cook and State of Illinois, have invented certain new and useful Improvements in Pneumatic Valves, of which the following is a specification.

This invention relates to improvements in pneumatic valves, and while it is especially applicable to pneumatic tires for bicycles and other vehicles it is also applicable to any other place where fluid is retained under pressure.

The primary object of my invention is the production of a cheap and durable valve which shall combine in the maximum degree simplicity, capacity, and efficiency both in admitting and retaining pressure. This object and such other objects as may hereinafter appear are attained by the devices illustrated in the accompanying drawings, in which—

Figure 1 represents an enlarged side elevation of a valve embodying my invention. Fig. 2 represents a central longitudinal section thereof. Fig. 3 represents a horizontal section taken on the line 3 3 of Fig. 2. Fig. 4 represents a detail elevation of the valve proper with its supporting device. Fig. 5 represents a horizontal section on the line 5 5 of Fig. 4. Fig. 6 represents a horizontal section on the line 6 6 of Fig. 4. Fig. 7 represents a perspective view of the blank from which the valve proper is formed. Fig. 8 represents a horizontal section thereof; and Fig. 9 is a side elevation similar to Fig. 4, but taken at right angles thereto.

Similar letters of reference indicate the same parts in the several figures of the drawings.

The external appearance of my valve does not materially differ from that of numerous valves now in use, and the general parts thereof are also similar to those in common use and comprise the casing A and the cap B therefor, having a screw-thread connection therewith and provided with an outwardly-projecting stem C, which terminates in a flattened end D, constituting a screw-driver when the cap is reversed and the stem is inserted in the central orifice of the casing A. The casing, as clearly illustrated in Fig. 2, is interiorly, as well as exteriorly, threaded, and in the sense that the part E is a plug-nipple this part is also old in the art, except as to the coöperation of the nipple thereof with the casing A, which serves to form an air-tight joint between the nipple and the casing through the intermediary of the valve proper, F, which feature I believe to be novel.

As illustrated in the drawings, the nipple G has a generally tapering form, tapering from its conjunction with the plug to its point, and, if desired, the exterior surface thereof may be ribbed, corrugated, or otherwise rendered irregular to afford a better grip for the valve F. The interior opposing wall of the casing A is correspondingly tapered, so that when the end of the valve F is sleeved upon the nipple and the latter is screwed down to position the valve will be firmly compressed between the nipple and the wall of the casing, and thus furnish an air-tight joint between the plug-nipple and the casing without the use of washers.

Aside from the above novel feature the principal feature of novelty of my invention is in the construction of the valve proper, F, which differs from that of any valve heretofore known to me. This valve is composed wholly of leather, and it should be formed of calfskin in order to possess the requisite flexibility, delicacy, and promptness of action. Although this valve in a sense forms a tube, especially when air is being forced through the valve by a pump applied to the screw-threaded end of the casing, yet the valve is not tubular, *per se*, and is not formed tubular, but is essentially a flat valve.

The valves which I have constructed and used were made from calfskin not quite one-sixteenth of an inch in thickness and not exceeding one-eighth of an inch in width. In order to avoid unnecessary stretching of the leather constituting the valve, which would cause unnecessary porosity and would therefore render the very thin walls of the valve liable to fracture, I cut the valves out of a strip of leather to the shape shown in Figs. 7 and 8, one end of the strip of leather being wider than the other. These pieces are pierced longitudinally by a narrow flat needle, which makes the comparatively narrow slit *a*, extending through the narrower part of the valve. At the broader part of the valve the leather strip is also pierced longitudinally, but with a wider blade than that used in piercing the narrower section of the valve, so as to form at the broader end of the valve the wide longitudinal slit *b*, connecting with the narrower slit *a*. Of course care should be taken that in making each of these slits through the strip of leather the walls surrounding such slits shall be left as near of a uniform thickness as possible. The broader end of the valve is then spread and the nipple inserted therein to its full length, which in effect transforms the large end of the valve from a rectangular cross-section to a substantially cylindrical cross-section. When the valve upon the plug-nipple is forced into position in the casing, the pressure between the nipple and the walls of the casing will flatten down, so as to round the corners of the leather, causing the same to assume a substantially cylindrical section, both on its interior and exterior periphery, for so much of its length as incloses the nipple.

To promote the flexibility of the leather as well as preserve it from decay and also for the purpose of rendering it more air-tight, I find it desirable to soak the valves in oil before they are applied to the nipple. In the drawings the valves are shown very much larger than they are necessarily made for use in connection with an ordinary pneumatic tube, and, indeed, the proportions of the parts are equal to nearly three times the actual dimensions of the valve in practice.

It will thus be seen that when air is forced through the nipple the tube will readily expand and allow a large volume of air to go into the tire at each stroke of the pump, as the passage through the valve is unobstructed; but immediately the pumping ceases the air-pressure upon the exterior of the valve will force the distended walls thereof together and collapse the same so tightly as to prevent the escape of the air. It is obvious that it would be practically impossible to make so small a tubular valve of leather by rolling or forming the same in a tube from a flat piece of leather, and it is equally obvious that even if it were possible the tube would not be sufficiently flexible to collapse, so as to retain the air, and even if the tube were flattened by pressure it would still be practically impossible to so flatten it, but that at each side of the bore thereof where the leather is folded there would always occur a small duct that would not hold air. Furthermore, the normal tendency of a tube thus formed and flattened would always be to spread or open, so as to resume its original tubular shape. With a valve constructed in accordance with my invention, however, no violence is done to the texture of the leather. It is neither compressed, bent, nor stretched out of its normal shape, and by reason of the longitudinal slitting thereof to form the bore of the valve there would be no normal tendency of the walls to separate. Indeed, my valve is essentially and normally a flat valve, and it requires the application of internal pressure to force the walls apart.

It will also be noted that even at the relatively large cylindric end of the valve, where it fits over the nipple, the leather is not objectionably distended, because by enlarging the blank at this end of the valve and making the slit larger the valve can be easily forced onto the nipple and without any tendency to distort the narrower part of the valve. Of course I do not desire to be limited to forming the valve out of a blank broader at one end than the other, as of course the valve could be formed of the same width throughout; but I prefer to form it as above described because of the better appearance and lesser dimensions of a valve so formed.

I am not aware that a flat tubular valve has ever been formed of leather in any way, but I am aware that prior to my invention it has been proposed to form a valve substantially similar to mine in appearance and construction out of a flattened rubber tube; but such a valve I do not consider the same as mine nor capable of producing the same results, nor would such valve be as durable or efficient. In the first place, the very nature of the service to which the valve is subjected would require the valve to be made out of pure rubber, and it is well known that pure rubber rots very quickly. This rotting of the rubber would be materially hastened by moisture and oil, which would in time become deposited thereon. This I have found to be true in my personal experience with the use of flattened rubber tubing, which I have found to be thoroughly impractical for the reasons above mentioned and for the further reason that it is practically impossible to have such valve remain air-tight. Furthermore, in all valves as heretofore constructed with flattened rubber tubes, so far as known to me, the elasticity alone of the rubber has been relied upon for its attachment to the plug-nipple, and it is evident that under the constant tension resulting from the stretching of the rubber over the nipple it will soon lose its elasticity and rot all the more quickly.

Another important advantage of my leather valve over the flattened rubber-tube valve is that the rubber valves must each be specially made and at a relatively large cost, whereas my valves may be cut out of waste strips of calfskin, as in practice the total length thereof need not exceed three-fourths of an inch. This is an item of almost as much consequence as the simplicity and efficiency of the valve.

Having thus fully described my invention, what I claim, and desire to secure by Letters Patent, is—

1. In a pneumatic valve, the combination with a nipple and a suitable casing, of a valve fitting on said nipple composed of a narrow strip of leather pierced longitudinally and centrally by a narrow slit extending from end to end thereof, substantially as described.

2. In a pneumatic valve, the combination with a nipple and a suitable casing, of a valve fitting on said nipple composed wholly of leather having a cylindric cross-section at the part fitting on said nipple and having a flat rectangular cross-section throughout the remainder of its length, the flat section being pierced centrally and longitudinally by a narrow slit, substantially as described.

3. As a new article of manufacture, a pneumatic valve composed of a single piece of leather cylindric in cross-section from a point between its center of length and one end and rectangular in cross-section throughout the remainder of its length, the rectangular portion being pierced centrally and longitudinally by a narrow slit, substantially as described.

4. As a new article of manufacture, a pneumatic valve composed of a single piece of leather cylindric in cross-section from a point between its center of length and one end and rectangular in cross-section throughout the remainder of its length, the rectangular portion being pierced centrally and longitudinally by a narrow slit, substantially as described.

HERMAN LEINEWEBER.

Witnesses:
C. L. WOOD,
F. H. DRURY.